M. W. LINK.
RADIUS ROD FOR AUTOMOBILES.
APPLICATION FILED MAY 5, 1919.
1,335,513.
Patented Mar. 30, 1920.
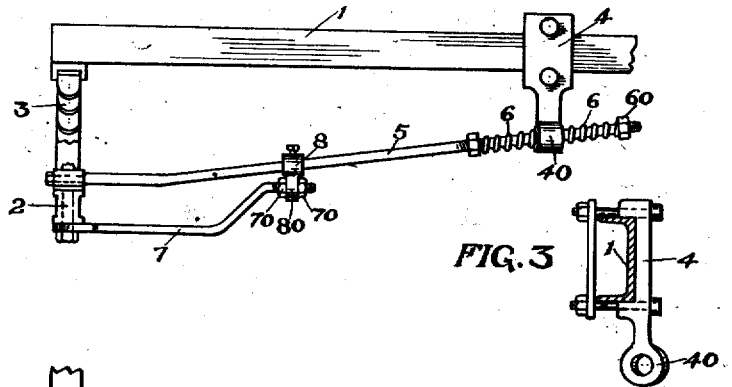
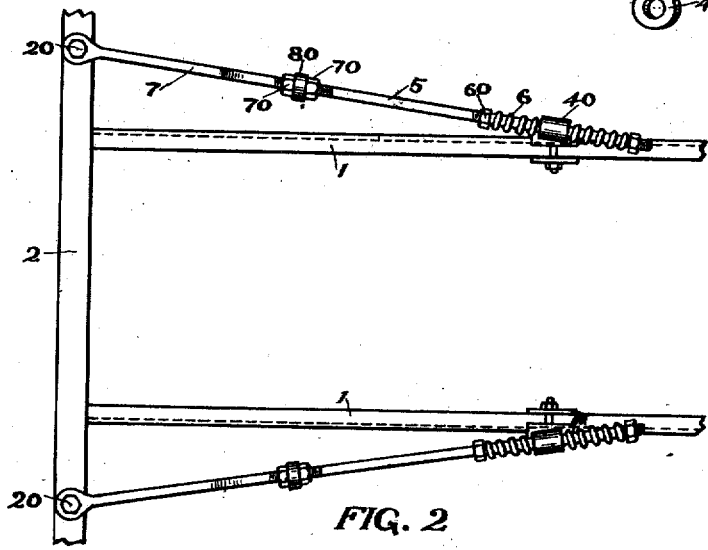
Inventor
MANFRED W. LINK
By Reynolds A Cook,
Attorney

UNITED STATES PATENT OFFICE.

MANFRED W. LINK, OF SEATTLE, WASHINGTON.

RADIUS-ROD FOR AUTOMOBILES.

1,335,513.  Specification of Letters Patent.  Patented Mar. 30, 1920.

Application filed May 5, 1919. Serial No. 294,697.

*To all whom it may concern:*

Be it known that I, MANFRED W. LINK, a citizen of the United States, and resident of the city of Seattle, county of King, State of Washington, have invented certain new and useful Improvements in Radius-Rods for Automobiles, of which the following is a specification.

My invention relates to radius rods for automobiles, or devices which are intended to connect the axles with members of the frame in such cases where the frame is supported from the axle by springs.

The object of my invention is to provide a means for connecting axles and chassis of the automobiles in such a way as to give a better support and prevent rocking of the springs transversely of their length. The features of my invention which I deem to be new and upon which I desire patent protection will be hereinafter set forth and then particularly defined in the claims.

In the accompanying drawings I have shown my invention embodied in a type of construction which I now prefer to use.

Figure 1 is a side view of a portion of an automobile chassis showing a front axle with its spring, and the manner of connecting these parts by the use of my invention.

Fig. 2 is a bottom plan view of the same parts.

Fig. 3 is a transverse section of one of the side bars of the chassis showing the manner of attaching my device thereto.

In the drawing, 1 represents a side bar of an automobile chassis, and 2 an axle, the same herein representing a front axle. It is common in certain makes of cars to employ a spring 3 which is of the elliptic or semi-elliptic type, to support the front end of the chassis from the front axle. When this is done a radius rod or rods are necessary to properly connect the chassis with the front axle, as the spring is not adapted for sustaining strains which are exerted transversely thereof, as would be the case when the front axle is driven through the chassis.

I have found that the type of radius bar which is quite commonly employed in certain makes of cars, and which is V shaped, does not connect these parts with sufficient rigidity. I have, therefore, devised the present bar which may be used, either in conjunction with, or in substitution for the said bar.

I provide an arm, as 4, which I clamp or secure in any suitable manner to the side bar of the chassis. This extends downward a short distance and has an eye 40 in its lower end, through which passes one end of the radius bar 5. This radius bar I prefer to secure in place with reference to the arm 4, in such a manner that it may yield slightly from front to rear.

The manner in which I prefer to do this, and which I have found to be very suitable, is to employ springs 6 surrounding the radius bar at each side of the arm 4, and to employ stops, such for instance as the nuts 60, upon the rod, whereby the springs 6 may be placed under whatever tension it is found desirable or necessary to give them. In this manner the radius rod 5 may be held with considerable firmness, and yet so that it may yield under a heavy thrust.

The other end of the radius rod 5 is secured to the axle in any suitable manner, as for instance by the use of bolts 20 which pass through the axle 2. The manner of securing this to the axle is, however, immaterial.

Along with the radius rod 5, I employ a supplementary rod 7. One end of this is secured to the lower side of the axle, the rod 5 being secured to the upper side of the axle. The rod 7 may be secured to the axle by the same bolt as is employed for securing the rod 5, or by any other suitable means. The other end of the rod 7 is secured to the main radius rod 5, preferably in such a manner that there may be a little adjustment secured lengthwise of the rods.

As illustrated, a block or arm 8 is secured to the rod 5 and has an eye 80, through which the end of the rod 7 passes. This end of the rod is threaded and nuts 70 screwing thereon are clamped against the face of the eye 80. By proper adjustment of these nuts, the relative position of the rods 5 and 7 may be adjusted a limited amount. In this manner the rods may be adjusted so as to insure that the axle 2 will be held against rocking about its longitudinal axis.

Two of these radius rods are provided, one at each side of the car, each secured to its respective side bar of the chassis. I have found that such a radius rod as this firmly holds the front axle and prevents side racking of the supporting spring 3. By its use it is possible to adjust the length of the radius rod so as to secure whatever position may be necessary in order to secure a true vertical movement between the parts of the chassis and axle which are connected by the spring. By adjustment of the short rod 7 relative to the rod 5, the true vertical position of the axle may be secured. This type of radius rod holds the axle firmly against the unusual shocks which may occur in running into holes or against curbs and the like. I have found that this radius rod, when used, makes it unnecessary to retain the old type of bars.

What I claim as my invention is:

1. The combination with a radius rod, of means for securing one end to the side bar of the chassis, means for securing the other end of the rod to one side of the axle, a supplemental rod secured to the opposite side of the axle, and means for securing said rods together intermediate the end connections of the main rod.

2. The combination with a radius rod for an automobile, of an arm and means for securing it to a side bar of the chassis, said arm extending downward and having an eye in its lower end, the radius rod having one end passing through said eye, a spring surrounding said rod at each side of the eye, stops for said springs on the rod, a supplemental rod having one end secured to an intermediate part of the radius rod and extending toward the other end of the main rod and spaced apart therefrom, and means for securing said rods to the axle at respectively top and bottom thereof.

3. The combination with a radius rod for automobiles of means for supporting one end of the rod to a side bar of the chassis inwardly from its axle, an arm secured to the middle part of said rod and having an eye, a supplemental rod having one end passing through said eye, adjusting nuts threaded on this end of the supplemental rod at opposite sides of the eye, and means for securing said rods to the axle at respectively top and bottom sides thereof.

Signed at Seattle, Washington, this 28th day of April, 1919.

MANFRED W. LINK.